Dec. 3, 1929.  J. M. KRUMM  1,738,303
STOCK WATERING FOUNTAIN
Filed Sept. 29, 1925  2 Sheets-Sheet 1
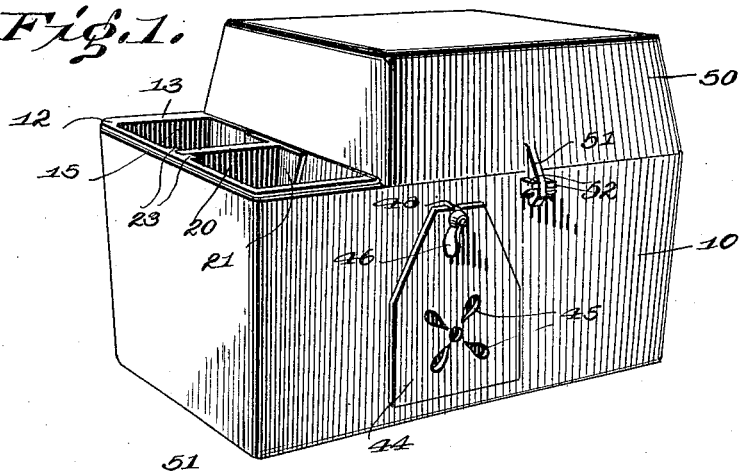
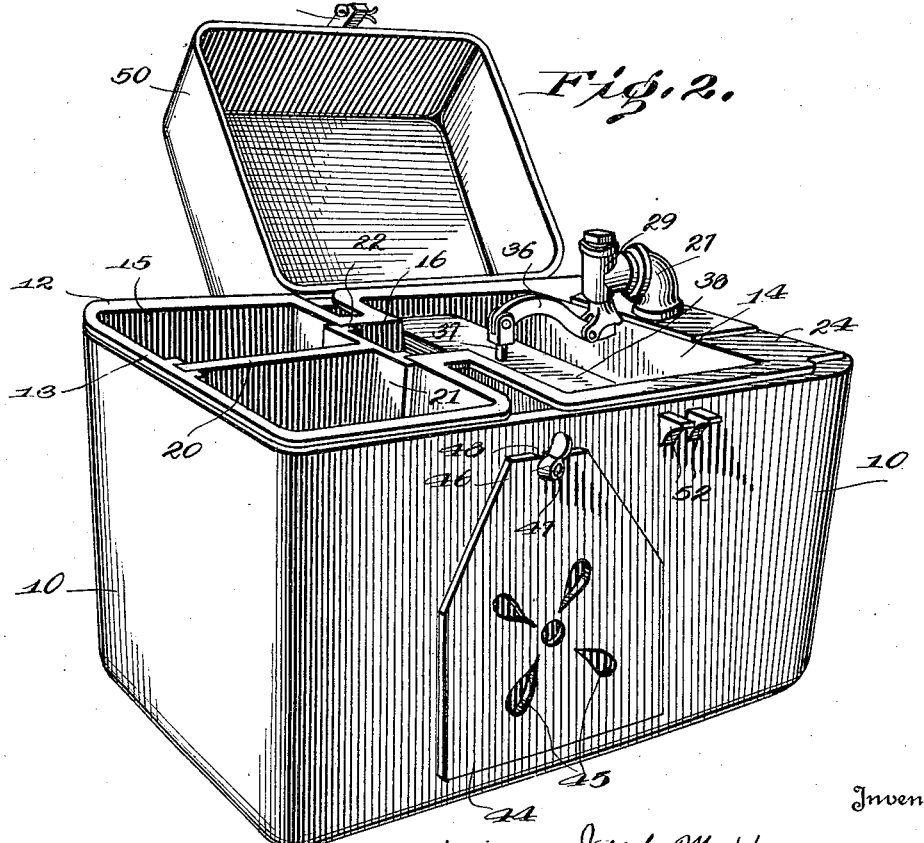
Inventor
Jacob M. Krumm
By
Attorney Dec. 3, 1929.     J. M. KRUMM     1,738,303
STOCK WATERING FOUNTAIN
Filed Sept. 29, 1925     2 Sheets-Sheet 2
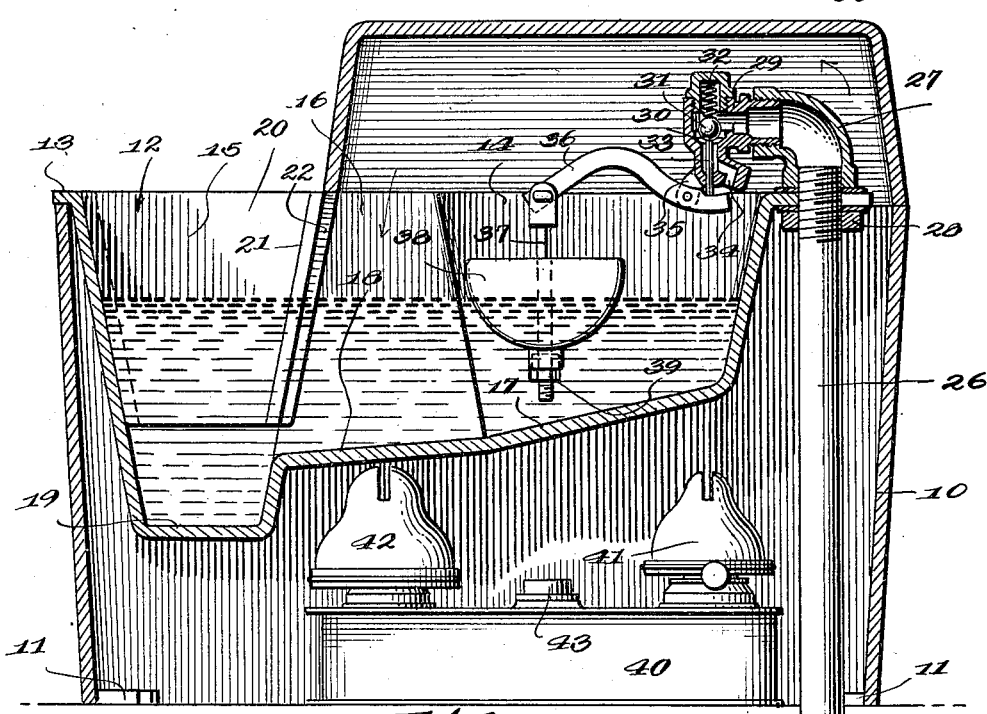
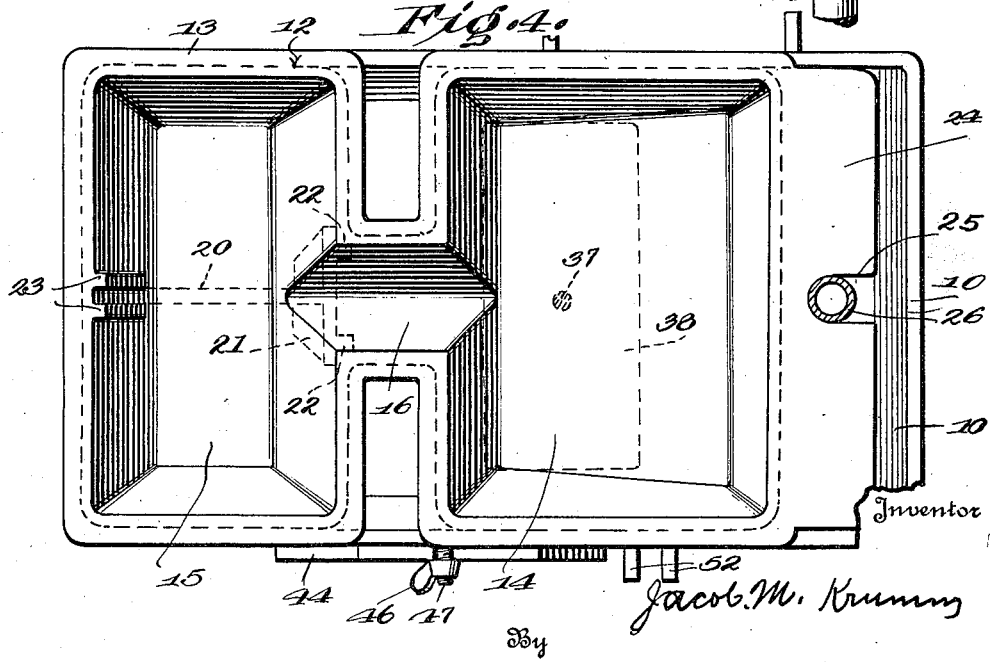
Inventor
Jacob M. Krumm
By
Attorney Patented Dec. 3, 1929

1,738,303

UNITED STATES PATENT OFFICE

JACOB M. KRUMM, OF NEWHALL, IOWA

STOCK-WATERING FOUNTAIN

Application filed September 29, 1925. Serial No. 59,316.

The present invention relates to a stock watering fountain, and aims to provide a novel and improved device of this character in which the quantity of water will be automatically controlled, and to construct the watering fountain with an animal drinking trough and a water supply chamber which communicates with the trough through a restricted passageway, said construction preventing the animals from coming in direct contact with the means for controlling the flow of water to the device.

Another object of the invention is to provide a watering device having the lower walls or bottom of the water supply chamber, restricted passageway, and drinking trough gradually declined to the drinking trough so that mud or other foreign matter will not collect in the water supply chamber and thus interfere with the means for controlling the supply of water, and to arrange the inflow of water to the supply chamber so that the water is directed on the bottom or lower wall of the chamber which will tend to wash any settlement therein to the drinking trough where the same may be easily removed.

A further object of the invention is to provide a lid or cover for the water supply chamber and the restricted passageway to prevent foreign matter dropping therein, as well as to prevent animals from drinking water therefrom.

A still further object of the invention is the provision of a pair of heating elements positioned below the water supply chamber and the restricted passageway for removing the chill from the water in extreme cold weather, one of said heating elements being positioned directly below the restricted passageway so as to more effectively heat the water prior to its entrance into the drinking trough.

A still further object of the invention is to provide a partition in the drinking trough which is adapted to close the upper portion of the restricted passageway from the trough, thus causing all water passing into the trough to enter at a low point in the trough so that all foreign matter carried therewith will settle in the bottom of the trough where the same may be easily removed when cleaning the fountain.

It is also an object of the invention to provide a device of the above indicated character, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a perspective view of my improved watering fountain,

Figure 2 is a similar view showing the cover swung to an open position,

Figure 3 is a longitudinal vertical section through my improved trough, and

Figure 4 is a plan view with the cover removed, and showing portions of the water supply system in section and in dotted lines.

In carrying out the invention, the numeral 10 designates a rectangular casing comprising four side walls tapered inwardly as they extend downwardly, and at each corner of the casing are inturned flanges 11 through which pass screws or other attaching means for securing the casing upon a platform or base. Positioned within the casing 10 and supported upon the upper edges of the side walls thereof is a water chamber 12, said chamber being provided with outwardly extending flanges 13 at its upper marginal edges which rest upon the upper edges of the rectangular casing 10. The water chamber 12 is composed of a water supply compartment 14, a drinking trough 15, and a restricted passageway 16 arranged between the supply compartment and drinking trough and communicating therewith. By referring to Figures 3 and 4, it can be seen that the supply compartment and the drinking trough are enlarged receptacles joined together by a reduced neck forming the restricted passageway connecting said supply compartment and trough, and that the side walls of the water compartment, restricted passageway, and drinking trough are inclined as they extend downwardly so that the lower portions thereof are of a reduced size. The bottoms 17 and 18 of the water compartment 14 and restricted passageway 16 are declined towards the drinking trough so as to cause any foreign matter received in said compartment and passageway to pass to the drinking trough, the latter having its bottom 19 positioned slightly below the bottoms of the supply compartment and passageway to form a pocket for receiving all sediment. A removable partition 20 extends across the drinking trough in the center thereof and is provided at one end with a right angularly extending plate 21 which closes the upper portion of the restricted passageway from the trough, thus causing any water passing into the trough from the water supply compartment to enter at a low point thereof and this is provided with ribs or vertically extending flanges 22 at the outer side thereof engaging the side walls of the restricted passageway for supporting one end of the partition, while a pair of vertical flanges 23 are formed on the opposite wall of the drinking trough for supporting the other end of the partition between them.

By referring to Figures 3 and 4 of the drawings, it can be seen that the restricted passageway is V-shape in vertical cross section, and that the plate 21 carried by the partition 20 extends downwardly to a point adjacent the lower portion of the restricted passageway so as to provide a very small opening for permitting the water to be replenished from the supply compartment as it is consumed.

The upper rear end of the water chamber is provided with a wide flange 24 having a slot 25 extending therein through which extends the upper end of a vertically arranged water supply pipe 26, located within the rectangular casing 10. The upper end of the water supply pipe 26 has threaded thereon an elbow 27 which abuts against the upper face of the flange 24 while a nut is threaded upon the pipe 26 for abutting against the lower face of the flange 24. It can thus be seen that the elbow and nut 28 will hold the upper end of the pipe rigidly connected to the flange 24. Threaded in the opposite end of the elbow 27 is the inlet nipple of a valve 29, said valve having a seat 30 arranged therein which is adapted to be engaged by a spherical member 31 for closing the valve. The spherical member 31 is normally held in contact with the seat 30 by means of a coil spring 32 positioned thereabove, while a pin 33 is slidably mounted in the valve structure for raising the spherical member 31 from its seat. The pin 33 extends partially through the outlet opening of the valve 29 and has its lower end extended through the valve casing and to a point slightly below the casing, while the outlet passageway 34 is at one side of the pin and opens in a downward direction to the supply compartment of the water chamber adjacent one end wall of said water chamber, the purpose of which will be described as the description proceeds. Arranged upon the valve casing is a downwardly extending lug 35 which pivotally supports an arm 36, said arm having one end thereof contacting with the lower end of the pin 33 while the opposite end thereof extends away from the valve and is pivotally connected to the upper end of a shaft 37 which carries a float 38. The float 38 is of elongated formation and is arranged within the water supply compartment 14 of the water chamber 12. The shaft 37 extends through the float 38 and has screw threaded on its lower end a nut 39 for adjusting the position of the float on the shaft so as to regulate the opening and closing of the valve at the desired water level.

Positioned within the casing 10 and under the water chamber 12 is a heater comprising a removable tank 40 provided with a pair of burners 41 and 42 arranged beneath the water supply compartment 14 and the restricted passageway 16 of the water chamber, said tank being provided with a filling opening covered by a removable cap 43. It can be seen that by arranging the burners as clearly shown in Figure 3 of the drawings, the chill will be removed from the water before the water passes into the drinking trough, and that by arranging one of the burners directly beneath the restricted passageway at the reduced lower portion thereof that the water will be more effectively heated at the point where the same enters the trough below the plate 21 of the partition 20. In order that the tank 40 and burners 41 and 42 may be removed for filling or lighting of the burners, I have provided a trap door 44 arranged upon the outside of the rectangular casing 10, said trap door being provided with openings 45 therein for permitting air to enter the casing to cause the proper burning of the burners. The trap door 44 is held to the casing by means of a clamping member 46 threaded upon a pin 47 extending through a slot 48 in the upper portion of the door.

Mounted on the rectangular casing 10 to close the water supply compartment and restricted passageway of the water chamber is a lid or hood 50, said hood or lid being hingedly connected at one end to the upper edge of the rectangular casing and provided at its opposite end with a depending apertured lug 51 which passes between a pair of lugs 52 projecting from the side of the casing and to which said lug is secured by a cotter pin passed through the aperture therein below the lugs 52, whereby to hold the lid in a closed position. It can be seen that the hood or lid 50 also encloses the valve structure as well as the water chamber 12 in the casing 10 to protect the supply compartment and passageway leading to the trough.

In operation, the animals drink from the trough 15 and when the level of the water in the connected water supply compartment and trough is lowered it will cause the float 38 to drop which in turn opens the valve and permits a fresh supply of water to enter the water chamber. By referring to Figure 3 it can be seen that the outlet passageway 34 of the valve 29 is arranged so as to direct the water towards the rear wall of the water supply compartment, thus tending to loosen any settlement on the inclined bottom 17 of said water supply compartment and wash the same over the inclined bottom 18 of the restricted passageway and into the lower portion of the drinking trough 19, thus carrying all foreign matter away from the valve structure. When the water has again resumed its normal level, the float rising therewith will cause the valve to close and thus cut off the supply of water to the water chamber. It is to be noted that water passing into the drinking trough must enter at the extreme lower portion of the restricted passageway where said passageway is of a reduced size, thus eliminating to a great extent foreign matter rising to a position where the same will be consumed during the drinking, said passing of the water to the drinking trough also being positioned at a point where the water entering the trough will be heated by the burner 42 positioned below the restricted passageway, thus increasing the efficiency of the heating power of the burner 42. When it is desired to clean the device, it is only necessary to remove the partition 20 which will permit the removal of all settlement in the bottom of the drinking trough, said settlement being washed from the water supply compartment and restricted passageway due to the declination of the bottom or lower walls of said compartment and passageway.

From the foregoing it can be seen that I have provided a simple and substantial stock watering fountain, which will be sanitary and which will permit the ready and easy cleaning of the device.

Having thus described my invention, what I claim as new is:

1. A stock watering fountain comprising a casing, a water chamber positioned in said casing and supported thereby, a drinking trough formed in one end of said water compartment, a water supply compartment formed in the opposite end of said chamber, said chamber having a restricted passageway formed therein for communicating said water supply compartment with said trough, said restricted passageway being substantially V-shape in vertical cross section to be reduced in size at its lower portion, a partition arranged in said drinking trough, a plate arranged upon one end of said partition and extending adjacent the lower portion of the restricted passageway for closing the upper portion of said restricted passageway from communication with the upper portion of the trough.

2. A drinking fountain comprising a casing open at its upper end, and a water chamber having flanges by which it is supported in the casing from the upper end thereof, said water chamber being in one piece and shaped to provide a water supply compartment at one end, a trough at the other end with its sides converging towards the bottom, and a channel extending between said water compartment and trough; together with a partition fitting between the sides of the trough and having a transverse plate closing the upper part of the channel.

3. A drinking fountain comprising a casing open at its upper end, and a water chamber having flanges by which it is supported in the casing from the upper end thereof, said water chamber being in one piece and shaped to provide a water supply compartment at one end, a trough at the other end with its sides converging towards the bottom, and a channel extending between said water compartment and trough; together with a partition in the trough fitting between the sides thereof and having a transverse plate closing the upper part of the channel, means for holding the partition against lateral displacement, and a float-controlled inlet valve in the water supply compartment, the water supply compartment and inlet valve being protected by a cover.

4. A drinking fountain comprising a casing open at its upper end, and a water chamber having flanges by which it is supported in the casing from the upper end thereof, said water chamber being shaped to provide a water supply compartment at one end, a trough at the other end with its sides converging towards the bottom, and a channel between said water supply compartment and trough and extending to the upper part of the water chamber, the trough having spaced apart lugs opposite the water channel; together with a partition in the trough fitting between the converging sides thereof and at one end engaging the aforesaid lug, said partition having a transverse plate closing the upper part of the channel where it enters the trough, and a float-controlled inlet valve in the water supply compartment.

5. A drinking fountain comprising a casing open at its upper end, and a water chamber having lateral flanges at its upper end which rest on the upper edge of the casing to support said water chamber in the upper part of the casing, the water chamber being shaped to provide a water supply compartment at one end, a trough at the other end with its sides converging towards the bottom, the compartment and trough being spaced apart, and a V-shaped channel between said compartment and trough; together with a partition extending across the trough and having a transverse plate closing the upper part of the V-shaped channel where it enters the trough.

6. A drinking fountain comprising a casing open at its upper end, and a water chamber having lateral flanges at its upper end which rest on the upper edge of the casing to support said water chamber in the upper part of the casing, the water chamber being shaped to provide a water supply compartment at one end having an inclined bottom, a trough at the other end with its sides converging towards the bottom, and a V-shaped channel between said compartment and trough with the bottom thereof inclined towards the trough in continuation of the inclined bottom of the water supply compartment; together with a partition extending across the trough and having a transverse plate closing the upper part of the channel where it enters the trough, a float-controlled inlet valve in the upper part of the water supply compartment, a cover for the water supply compartment and inlet valve, and a heater in the casing below the water chamber.

In testimony whereof, I have affixed my signature.

JACOB M. KRUMM.